United States Patent
Suontausta et al.

(10) Patent No.: US 7,574,411 B2
(45) Date of Patent: Aug. 11, 2009

(54) LOW MEMORY DECISION TREE

(75) Inventors: Janne Suontausta, Tampere (FI); Jilei Tian, Tampere (FI)

(73) Assignee: Nokia Corporation, Espoo (FI)

( * ) Notice: Subject to any disclaimer, the term of this patent is extended or adjusted under 35 U.S.C. 154(b) by 267 days.

(21) Appl. No.: 10/835,597

(22) Filed: Apr. 29, 2004

(65) Prior Publication Data

US 2004/0267785 A1 Dec. 30, 2004

(30) Foreign Application Priority Data

Apr. 30, 2003 (FI) ................... 20035055

(51) Int. Cl.
*G06N 3/04* (2006.01)
*G06N 3/08* (2006.01)
*G10L 15/28* (2006.01)

(52) U.S. Cl. ............ 706/27; 704/231; 704/256.1; 704/256.2

(58) Field of Classification Search ........... 706/27; 704/254, 231, 256.1, 256.2

See application file for complete search history.

(56) References Cited

U.S. PATENT DOCUMENTS

| | | | |
|---|---|---|---|
| 4,571,679 A * | 2/1986 | Russell et al. ............ | 714/25 |
| 5,033,087 A | 7/1991 | Bahl et al. | |
| 5,530,957 A | 6/1996 | Koenig | |
| 5,619,615 A * | 4/1997 | Pitchaikani et al. ....... | 706/10 |
| 6,163,769 A | 12/2000 | Acero et al. | |
| 6,411,957 B1 | 6/2002 | Dijkstra | |

FOREIGN PATENT DOCUMENTS

| | | |
|---|---|---|
| EP | 0586086 B1 | 3/1994 |
| GB | 2277387 | 10/1994 |
| JP | 06-266781 | 9/1994 |

OTHER PUBLICATIONS

Yali Amit et al., Joint Induction of Shape Features and Tree Classifiers, IEEE Transactions on Pattern Analysis and Machine Intelligence, vol. 19, No. 11, Nov. 1997.*
Bryan Pellom et al., SONIC: The University of Colorado Continuous Speech Recognizer, Technical Report TR-CSLR-2001-01.*
Campos, Huffman algorithm, making codes from probabilities , 2000.*

(Continued)

*Primary Examiner*—Joseph P Hirl
*Assistant Examiner*—Nathan H Brown, Jr.
(74) *Attorney, Agent, or Firm*—Ware, Fressola, Van Der Sluys & Adolphson LLP (57) ABSTRACT

Management of a low memory treelike data structure is shown. The method according to the invention comprises steps for creating a decision tree including a parent node and at least one leaf node, and steps for searching data from said nodes. The nodes of the decision tree are stored sequentially in such a manner that nodes follow the parent node in storage order, wherein the nodes refining the context of the searchable data can be reached without a link from their parent node. The method can preferably be utilized in speech-recognition systems, in text-to-phoneme mapping.

34 Claims, 5 Drawing Sheets

OTHER PUBLICATIONS

Main et al., Data Structures And Other Objects Using C++, Addison Wesley, 1997, pp. 492-431.*

Patent Abstracts of Japan, Publication No. 06-266781, published Sep. 22, 1994, "Tree Storage in Navigable Form," Koenig, Andrew R.

"Fundamental Algorithms", The Art of Computer Programming, Knuth, 1968, Chapter 2.3.3.

"Graph Theory and Computing", Read, Academic Press, 1972, Chapter 11, pp. 172-178.

* cited by examiner

| R | I1 | L1 | R | I1 | L2 | R | I1 | L3 | R | L4 | R | I2 | L5 | R | I2 | L6 |

Fig. 6a

| R | I1 | L4 | I2 | L1 | L2 | L3 | L5 | L6 |

Fig. 6b

| R | I1 | L4 | I2 | L1 | L2 | L3 | L5 | L6 | L1 | M1 | N1 | O1 | ... |

Fig. 6c

| R | I1 | L4 | I2 | L1 | L2 | L3 | L5 | L6 | L1 | M1 | M2 | M3 | N1 | N2 | ... |

LOW MEMORY DECISION TREE

FIELD OF THE INVENTION

The invention relates to a method for managing a treelike data structure. The invention also relates to a system for implementing the aforementioned method. Also, the invention relates to a device. The invention relates also to a treelike data structure as well as to computer program product for using the aforementioned treelike data structure.

BACKGROUND OF THE INVENTION

Multilingual aspects are becoming increasingly important in the Automatic Speech Recognition systems. The kind of speech recognition system comprises a speech recognition engine which may for example comprise units for automatic language identification, on-line pronunciation modeling (text-to-phoneme) and multilingual acoustic modeling. The operation of the speech recognition engine works on an assumption of that the vocabulary items are given in textual form. At first, the language identification module identifies the language, based on the written representation of the vocabulary item. Once this has been determined, an appropriate on-line text-to-phoneme modeling scheme is applied to obtain the phoneme sequence associated with the vocabulary item. The phoneme is the smallest item that differentiates the pronunciation of a word from the pronunciation of another word. Any vocabulary item in any language can be presented as a set of phonemes that correspond the changes in the human speech production system.

The multilingual acoustic models are concatenated to construct a recognition model for each vocabulary item. Using these basic models the recognizer can, in principle, automatically cope with multilingual vocabulary items without any assistance from the user. Text-to-phoneme has a key role for providing accurate phoneme sequences for the vocabulary items in both automatic speech recognition as well as in text-to-speech. Usually neural network or decision tree approaches are used as the text-to-phoneme mapping. In the solutions for language- and speaker-independent speech recognition, the decision tree based approach has provided the most accurate phoneme sequences. One example of a method for arranging a tree structure is presented is the U.S. Pat. No. 6,411,957B1.

In the decision tree approach, the pronunciation of each letter in the alphabet of the language is modeled separately and a separate decision tree is trained for each letter. When the pronunciation of a word is found, the word is processed one letter at a time, and the pronunciation of the current letter is found based on the decision tree text-to-phoneme model of the current letter.

Figure 1:
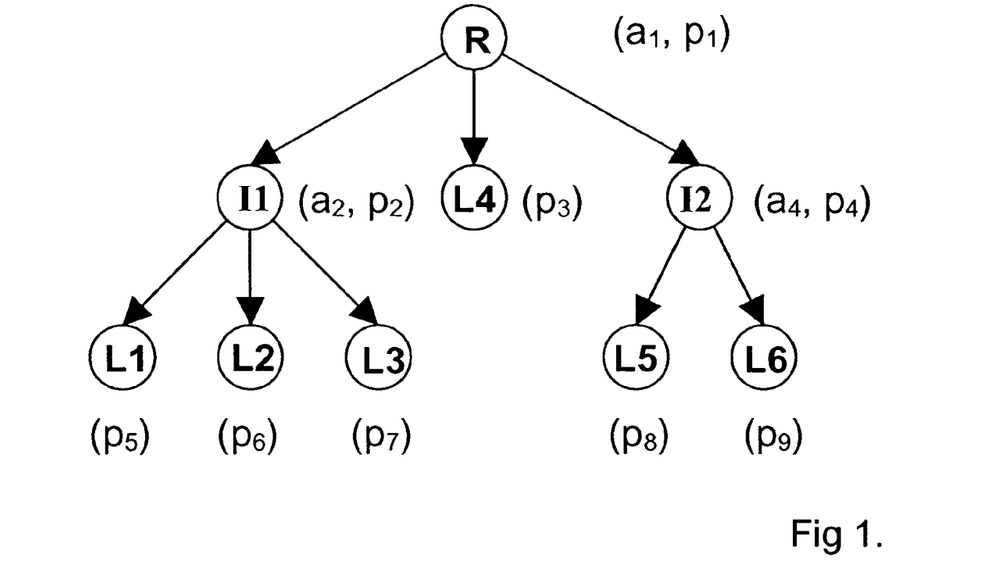
FIG. 1 shows an exemplary decision tree with nodes and leaves with attributes and phoneme.

An example of the decision tree is shown in FIG. 1. It is composed of nodes, which can be either internal nodes I or leaves L. A branch is a collection of nodes, which are linked together from a root R to the leaf L. The node can be either a parent node or a child node. The parent node is a node from which the tree can be traversed further, in other words; has a child node. A child node in the tree is a node that can be reached from a parent node. The internal node I can be both a parent and a child node, but the leaf is only a child node. Every node in the decision tree stores information. Stored information varies depending on the context of a decision tree.

In the speech-recognition systems the internal nodes I usually have information about a word being recognized and the pronunciation of the word. The pronunciations of the letters of the word can be specified by the phonemes ($p_i$) in certain contexts. Context refers, for example, to the letters in the word to the right and to the left of the letter of interest. The type of context information can be specified by an attribute ($a_i$) (also called attribute type) which context is considered when climbing in the decision tree. Climbing can be implemented with a help of an attribute value, which defines the branch into which the searching algorithm should proceed given the context information of the given letter.

The tree structure is climbed starting from the root node R. At each node the attribute type ($a_i$) should be examined and the corresponding information should be taken for determining the context of the current letter. By the information the branch that matches the context information can be moved along to the next node in the tree. The tree is climbed until a leaf node L is found or there is no matching attribute value in the tree for the current context.

Figure 2:
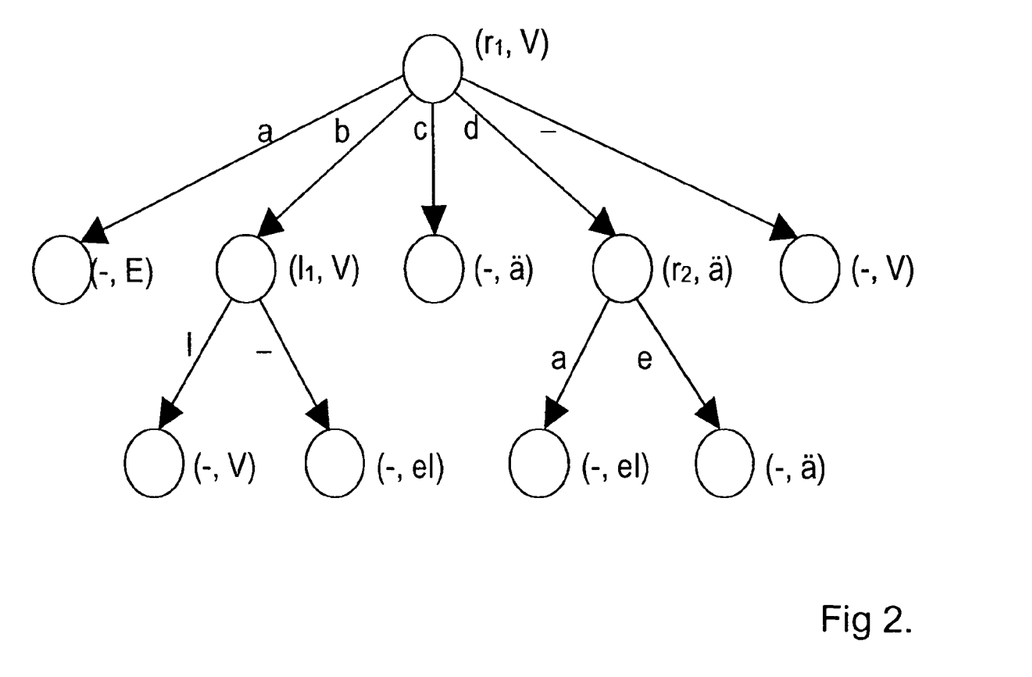
FIG. 2 shows an exemplary decision tree for letter 'a' used in a text-to-phoneme mapping.

A simplified example of the decision tree based text-to-phoneme mapping, is illustrated in FIG. 2. The decision tree in the figure is for the letter 'a', wherein the nodes represents the phonemes of the letter 'a'. It should be noticed that the illustration is simplified and does not include all the phonemes of the letter 'a'. In the root node there is information about the attribute type, which is the first letter on the right and denoted by $r_1$. For the two other internal nodes, the attribute types are the first letter on the left denoted by $l_1$ and the second letter on the right denoted by $r_2$. For the leaf nodes, no attribute types are assigned.

When searching the pronunciation for the word 'Ada', the phoneme sequence for the word can be generated with the decision tree presented in the example and a decision tree for the letter 'd'. In the example, the tree for the letter 'd' is composed of the root node only, and the phoneme assigned to the root node is phoneme /d/.

When generating the phoneme sequence, the word is processed from left to right one letter at a time. The first letter is 'a', therefore the decision tree for the letter 'a' is considered first (see the FIG. 2). The attribute $r_1$ is attached to the root node. The next letter after 'a' is 'd', therefore we proceed to the branch after the root node that corresponds to the attribute value 'd'. This node is an internal node to which attribute $r_2$ is attached the second letter to the right is 'a', and we proceed to the corresponding branch, and further to the corresponding node which is a leaf. The phoneme corresponding to the leaf is /el/. Therefore the first phoneme in the sequence is /el/.

The next letter in the example word is 'd'. The decision tree for the letter 'd' is, as mentioned, composed of the root node, where the most frequent phoneme is /d/. Hence the second phoneme in the sequence is /d/.

The last letter in the word is 'a', and the decision tree for the letter 'a' is considered once again (see FIG. 2). The attribute attached to the root node is $r_1$. For being a last letter in the word, the next letter to the right of letter 'a' is the grapheme epsilon '_'. The tree is climbed along the corresponding branch to the node that is a leaf. The phoneme attached to the leaf node is /V/, which is the last phoneme in the sequence.

Finally the complete phoneme sequence for the word 'Ada' is /el/ /d/ /V/. The phoneme sequence for any word can be generated in a similar fashion after the decision trees have been trained for all the letters in the alphabet.

The decision tree training is done on a pronunciation dictionary that contains words and their pronunciations. The strength of the decision tree lies in the ability to learn a compact mapping from a training lexicon by using information theoretic principles.

As said, the decision tree based implementations have provided the most accurate phoneme sequences, but the drawback is large memory consumption when using the decision tree solution as the text-to-phoneme mapping. Large memory consumption is due to numerous pointers used in the linked list decision tree approach. The amount of the memory increases especially with languages such as English or the like, where pronunciation irregularities occur frequently.

The prior art solutions for the said problem can be categorized into lossy and lossless methods. When the memory requirement of decision trees is tried to reduce, mostly the lossy methods are used. These approaches are for example grouping the attribute values of the decision trees, optimizing the stopping criterion of the decision tree training process, pruning the decision tree based on error counts, and other similar methods.

For the prior art low memory decision tree methods the performance is always decreased, when the system is optimized for memory. There is always a trade-off between accuracy and memory consumption. On the contrary, due to the approach according to the invention, there is hardly any degradation in accuracy and the memory consumption is optimized. Memory requirements can be significantly reduced without degradation in performance.

SUMMARY OF THE INVENTION

For achieving this aim, the method for managing a treelike data structure, comprises steps for creating a decision tree that comprises a parent node and at least one leaf node, and also steps for searching data from said nodes. Said method is characterized by the decision tree, which is created by storing the nodes sequentially in such a manner that nodes follow the parent node in storage order, wherein the nodes refining the context of the searchable data can be reached without a link from their parent node.

For the system for managing a treelike data structure is characterized by the creator, which is adapted to create the decision tree by storing the nodes sequentially in such a manner, that nodes follow the parent node in storage order, wherein the nodes refining the context of the searchable data are reachable without link from their parent node.

The device, according to the invention, comprises a storage medium for storing data in a treelike data structure and a processor for processing data in said structure said processor comprising a decision tree creator and a searcher for the data from said nodes. The device is characterized in that the creator is adapted to create the decision tree by storing the nodes sequentially in such a manner, that the nodes follow the parent node in storage order, wherein the nodes refining the context of the searchable data are reachable without link from their parent node.

Said treelike data structure, which comprises a parent node and at least one leaf node, said nodes comprising searchable data, is characterized by the nodes that are located sequentially in such a manner, that the nodes follow the parent node in a storage order, wherein the nodes refining a context of the searchable data is reachable without a link from their parent node.

The computer program product, according to the invention, comprises a computer storage medium and a computer readable code written on the computer storage medium for using a treelike data structure, comprising a parent node and at least one leaf node, stored into said storage medium. The computer readable code comprises instructions for searching data from nodes. The computer program product is characterized in that, the computer readable code has instructions for arranging nodes sequentially in such a manner, that the nodes follow the parent node in storage order, wherein the nodes refining the context of the searchable data is reachable without a link their parent node.

The first part of the invention describes a clipped alignment method, which is used in training the decision tree. This method enables a high quality aligned dictionary being made in line with the linguistic knowledge. Without the clipping method, as in the prior art methods, the linguistic knowledge is not fully used. Also due to the current invention wrong entries (phoneme-letter-pairs) can easily be found out. As a consequence the irregularity is reduced and the memory and accuracy of the decision trees, which are trained on the aligned dictionary, are improved. In similar, the invention provides a possibility to remove the entries for foreign words and names if they obey different pronunciation rules than English. Obviously the irregularity is reduced too. To some extent the clipped alignment method can also detect wrong transcriptions and further discard them away. Since the entries containing impossible mapping pairs are clipped out, the possible mapping pair with small probability can be correctly utilized.

BRIEF DESCRIPTION OF THE DRAWINGS

The preferred embodiment of the invention is set forth in the drawings, in the detailed description which follows, and in the claims annexed to. Further objects and advantages of the invention are also considered in the description. The invention itself is defined with particularity in the claims.

DETAILED DESCRIPTION OF THE INVENTION

The method according to the invention applies the lossless coding on decision tree combined with a constrained Viterbi algorithm. The invention is advantageous for languages, such as e.g. English, where one letter may correspond to none, one or two phonemes.

Figure 4:
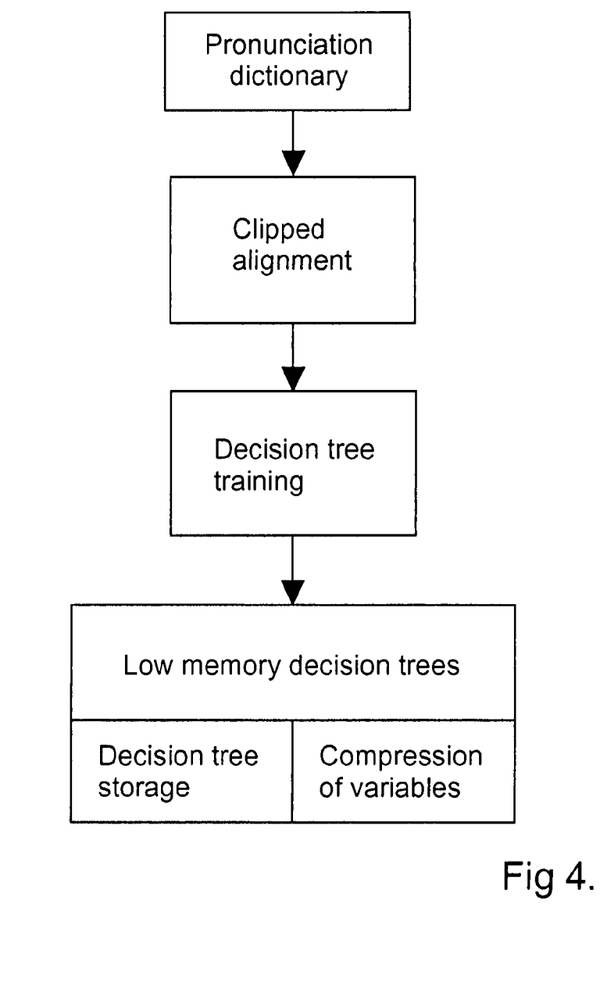
FIG. 4, shows a principled illustration of the method according to the invention.

A high level description of the proposed pronunciation modeling approach based on the decision trees is presented in the FIG. 4. The approach is based on the pronunciation dictionary that is aligned with the clipped alignment algorithm. The training of the decision trees is based on the aligned pronunciation dictionary and the outcome of training is the decision tree based pronunciation model. After the training, the trees are converted into the low memory format in order to minimize the memory requirements of the decision trees. The low memory decision tree representation is composed of converting the nodes of the decision tree into the suitable format and compressing the variables of the decision trees with the compression scheme that yields the minimum memory consumption. The invention presents the methods for performing the clipped training alignment and for converting the decision trees into the low memory format. The pronunciation dictionary contains the words and their pronunciations. The decision tree is capable of learning a compact mapping from a training lexicon by using information theoretic principles.

For clarifying the invention it is divided into following parts:
1. Clipped alignment method
2. Low memory decision tree method
3. Bit allocation for the decision tree data elements.

The first part of the clipped alignment method according to invention is designed for the training of the low memory decision tree that is further described in part two. In the third part the methods for compressing the data elements of the decision tree are represented to achieve the minimum memory requirements. But at first, before training the decision tree, entries or, as referred in the description, entries in the pronunciation dictionary are aligned in order to find the correspondence between the letters and the phonemes. The alignment can be obtained by inserting phonemic nulls (called phoneme epsilons, marked "_") in the phoneme sequence for those letters that are not pronounced and pseudophonemes for those letters that produce two phonemes. The pseudophonemes are obtained by concatenating two phonemes (/eI/, /oU/, . . . ) that are known to correspond to a single letter.

The HMM-Viterbi algorithm is adapted to be used for the alignment. The use of the HMM-Viterbi algorithm ensures that the alignment is performed in an optimal manner in the statistical sense, and therefore minimizes the leftover entropy of the dictionary entry. Furthermore, an advantage of using the HMM-Viterbi algorithm for the alignment is that an optimal alignment in the statistical sense can be reached. An example of the aligned pronunciation dictionary is given in the Table 1:

TABLE 1

An example of the aligned pronunciation dictionary.

| Word | Aligned phoneme sequence |
| --- | --- |
| aaron | _ E r2 s@ n |
| abraham | eI b r2 s@ h ä m |
| accola | A: _ k oU 1 s@ |
| ackerman | ä _ k _ s@ r m s@ n |
| ada | eI d s@ |
| adelaide | ä d s@ 1 eI _ d _ |
| ahmanson | A: _ m s@ n s s@ n |
| aikman | eI _ k m s@ n |
| alabamas | A: 1 A: b A: m s@ z |

The Hidden Markov Model (HMM) is a well-known and widely used statistical method that has been applied for example in speech recognition. This model can also be referred to as Markov sources or probabilistic functions of a Markov chain. The underlying assumption of the HMM is that the signal can be well characterized as a parametric random process, and that the parameters of the stochastic process can be determined/estimated in the precise, well-defined manner. The HMM can be classified into discrete models or continuous models according to whether observable events assigned to each state are discrete, such as codewords, or continuous. With either way, the observation is probabilistic. The model is with an underlying stochastic process that is not directly observable (it is hidden) but can be seen only through another set of stochastic processes that produce the sequence of observations. HMM is composed of hidden states with transition among states. The mathematical representation includes three items: state transition probability between states, observation probability of each state and initial state distribution. Given HMM and observation, the Viterbi algorithm is used to give the observation state alignment through following the best path.

In order to align the pronunciation dictionary, the penalties P(f, l) for a given letter-phoneme pair of data elements, the elements are initialized with zero if the phoneme f can be found in the list of linguistically allowed phonemes for the letter l, otherwise they are initialized with large positive values. i.e., the penalty depends on the validity of a given letter-phoneme pair. Given the initial penalty values, the dictionary is aligned in two steps. In the first step, all the possible alignments are generated for each entry or element in the dictionary. Based on all the aligned entries, the penalty values are then further re-initialized, re-estimated, or re-scored. In the second step, only the single best alignment is found for each entry.

Figure 3:
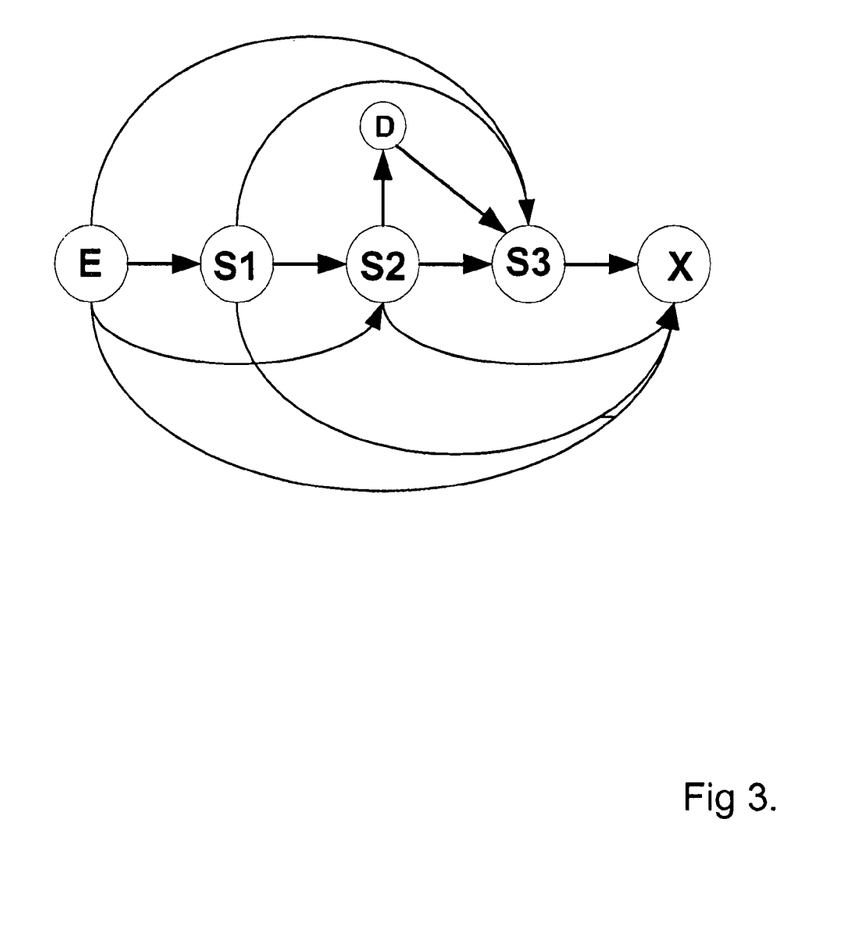
FIG. 3 shows an example of the grapheme hidden Markov model.

For each entry, the best alignment can be found by the Viterbi algorithm on the grapheme HMM. An example of the hidden Markov model is shown in the FIG. 3. The grapheme HMM has entry E, exit X and letter S1, S2, S3 states. The letters that may map to pseudophonemes are handled by having a duration state D. The states S1 to S3 in the FIG. 2 are the states that correspond to the pronounced letters in the word. State S2 corresponds to a letter that may produce pseudophoneme and that is why state S2 has a duration state D. Skips from all the previous states to the current state are allowed in order to support the phoneme epsilons. Each state and the duration state holds a token that contains the cumulative penalty of aligning the phoneme sequence against the grapheme HMM and the state sequences that correspond to the cumulative score. The phoneme sequence is aligned against the letters by going through the phoneme sequence from the beginning to the end one phoneme at a time. Token passing is carried out in order to find the Viterbi alignment between the letters and the phonemes. In the end, the token that has the lowest cumulative penalty is found over all the states of the HMM. Based on the state sequence of the token, the alignment between the letters of the word and the phonemes can be determined.

The aligned dictionary can contain entries as listed below:
a) Foreign names and words, like "Juan, Xiong, etc" are included in an English pronunciation dictionary. It is preferable in the text-to-phoneme mapping to use those with the corresponding language rather than with the English. Those words make the pronunciation more irregular and irregular pronunciation makes the decision tree bigger and more inaccurate.
b) Wrong transcription. It is evitable to have some wrong transcriptions in the dictionary due to typos and some other unpredictable reasons. They make pronunciation more irregular and inaccurate too.
c) Wrong alignment, for example "apple—ä p V 1 _". By basic linguistic knowledge it is known that letter "p" has never mapped to vowel phoneme "V". Again, it makes the pronunciation more irregular and inaccurate.

For solving the above-mentioned problems the clipped alignment method, which utilizes the Viterbi algorithm, according to invention is proposed. By this the high-quality aligned pronunciation will be more regular, leading to lower memory requirements for the decision tree based text-to-phoneme models according to invention.

1. Clipped Alignment Method for Training Low Memory Decision Trees

The alignment, according to the invention, is done based on re-estimated penalty P(f, l) that is estimated from the aligned dictionary described above. Obviously the formed alignment produces very rough alignment, so the penalties P(f, l) are by no means very accurate. It also assigns a value to P(f, l) in the case that is not linguistically possible. For example, P("V", "p") has a value, but it is clearly against the language knowledge. In order to avoid this and to overcome the above-mentioned difficulties (a-c), the constraint is applied to the Viterbi decoding, defined as the clipped method.

The proposed clipped alignment algorithm needs to define the alphabetic and phonetic sets for the target language. The list in table 2 specifies the phonemes and pseudophonemes the letter may linguistically correspond to (based on the language knowledge by human expert). The table 2 below includes truly language-dependent information.

TABLE 2

An example of phoneme and pseudophoneme definitions for the alphabet.

| Letter | Corresponding (pseudo)phonemes |
|--------|-------------------------------|
| a | V, A, ä, eI, e, O, _ |
| b | b, _ |
| c | k, s, tS, S, _ |
| ... | ... |
| l | l, V, V_l, _ |
| ... | ... |
| z | z, s, tS, t, t_s, dZ, S, _ |

Table 2 may be implemented in different ways but the implementations work for the same purpose.

Based on all the aligned entries, the penalty values are further re-initialized, re-estimated, or re-scored. By this way, only a single best alignment is found for each entry. P(f, l) is estimated as usual if the phoneme f can be found in the table 2, which means the phoneme f for the letter l is linguistically allowed. If the phoneme f can not be found in table 2 for given letter l, the constraint is applied to set P(f, l) to be the highest value without doing any estimation, i.e., by adding a constraint for an invalid element.

Now only the letter-phoneme-pairs that are found in the described table above, are allowed in the aligned dictionary for training the decision tree based text-to-phoneme mapping.

Due to the method, the linguistic information can be rather easily taken into account. Some entries are clipped out due to the clipping method in alignment. By checking the clipped entry list, it is easy to find or tune the linguistic information, for example define new pseudophonemes, adding missing phonemes into the letter-dependent phoneme set, etc. Having better linguistic information involved, alignment can be improved and memory usage can be reduced.

2. Decision Tree Model Structure

The size of the text-to-speech model for the given language is minimized by minimizing the memory requirements of the decision tree text-to-phoneme models of all the letters. Therefore the minimization of the memory requirements of a single decision tree. text-to-phoneme model is considered.

The direct linked list implementation of the decision tree model presented in the FIGS. 1 and 2 is not preferably used. This is due to the fact that in the linked list approach, each node of the tree would contain a pointer table as an overhead. In order to remove this overhead, the nodes of the tree are stored in memory preferably in such an order that allows to use them for text-to-phoneme conversion.

Figure 5:
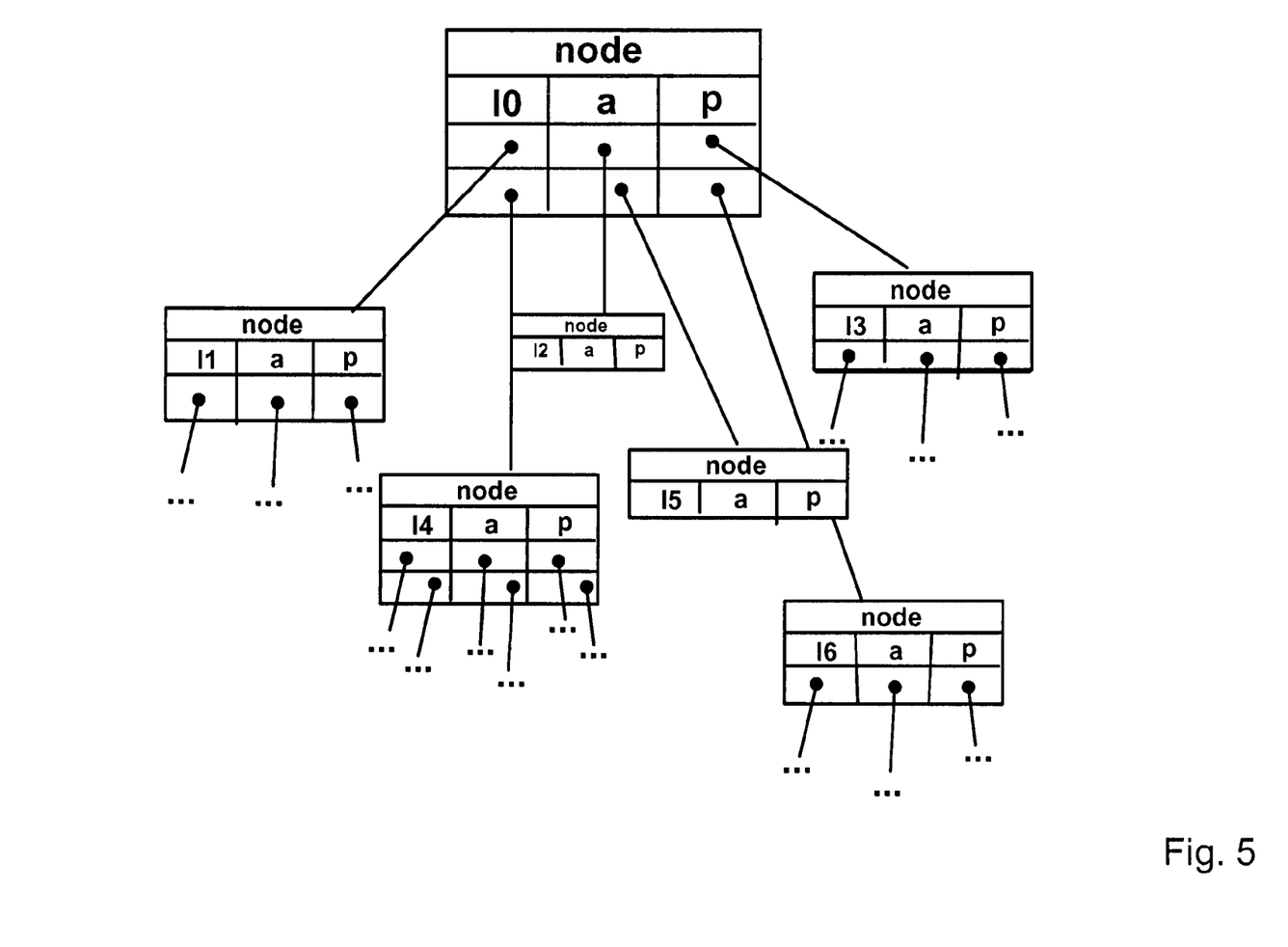
FIG. 5, shows an example of a linked list approach, where a node comprises a pointer table.

This order has to be such that when a correct context is being refined for a letter, the next matching context is also the context on the immediately following level. In other words, although the linked-list tree according to prior art can be stored in the memory in any order, the tree according to the invention cannot. The structure of the prior art linked-list tree takes care of correct referencing automatically: when the next-level nodes are searched, the algorithm finds out the information by using the links (pointers) stored in the nodes. These links use memory, and their only purpose is to enable the traversing of the tree. An example of the linked list approach can be seen in FIG. 5, where the node (I0) comprises a pointer table, from which the child nodes (I1, I2, I3, I4, I5, I6), corresponding the letters, are reached. Unless the child node is a leaf node (such as I2, I5) the child node comprises still another pointer table.

The invention is based on the realization that by storing the tree nodes in a proper order in the memory, the links or pointers can be omitted from the nodes, thereby saving memory. Such organizations are e.g. the depth-first and breadth-first storage schemes, or certain combinations of these, shown in FIGS. 6a-d. In other words, the invention lies in storing the tree contents in a specific order suitable for text-to-phoneme conversion so that the tree can be searched properly even without the links in the tree.

Figure 6A:
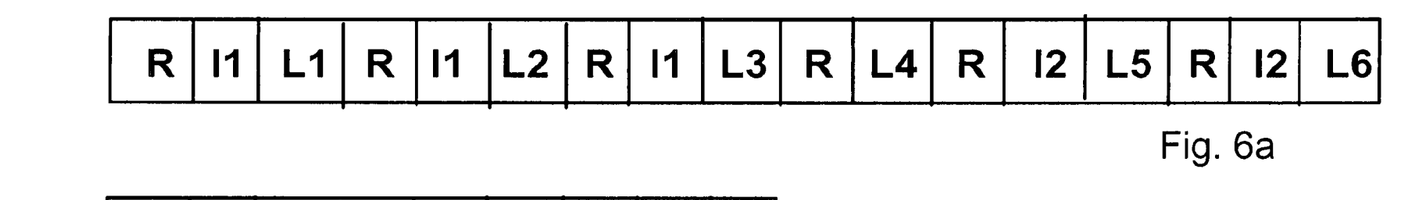
FIGS. 6a-6d show examples of four methods for storing the decision tree.

In the depth-first storage scheme, the nodes of the tree are stored by following the tree structure first all the way to the last leftmost leave. Then, the next branch to the right is traversed all the way to the last leave. FIG. 6a shows an example of the decision tree structure of FIG. 1, where nodes and leaves are converted into low memory depth-first format. In the depth-first storage format each node is preferably stored only once. For example the root node is stored only once. It should be evident that each node, for example the root node, can be stored twice or more (as in FIG. 6a).

Figure 6B:
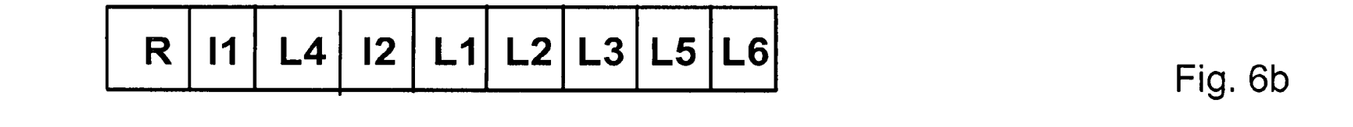

In the breadth-first storage scheme, the root R of the tree is stored first, then come all the nodes on the first layer, then all the nodes on the second layer etc. FIG. 6b shows an example of the decision tree structure of FIG. 1, where nodes and leaves are converted into low memory breadth-first format.

Figure 6C:
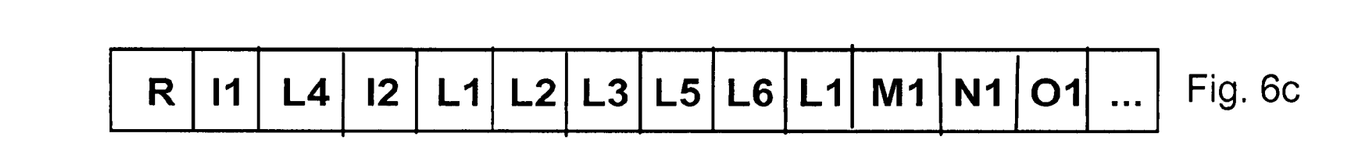
Figure 6D:
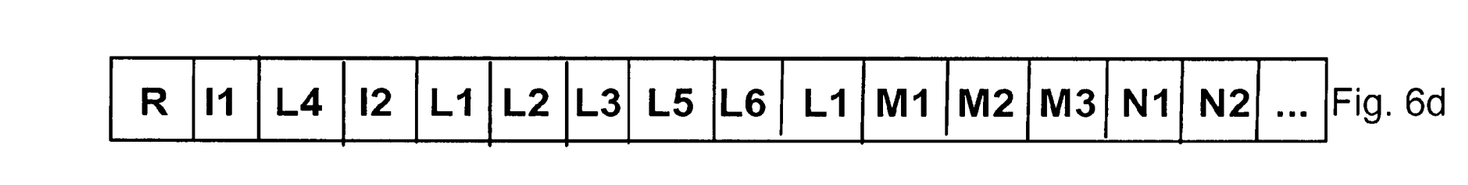

In a mixed storage scheme, the depth-first and the breadth-first scheme can be intermixed. FIGS. 6c and 6d show examples of the intermixed storage scheme of decision tree 1 continued with lower node layers (M, N, O). For example, as in FIG. 6c, the breadth-first scheme can be used up to layer three (L), and from that point on, the depth-first scheme is used. Alternatively, as in FIG. 6d, the full breadth-first scheme can be used up to layer three (L), and then the subtrees for each node on layer three (L) are stored individually in breadth-first order. This may be done to enable faster memory access of the probably needed nodes.

The main purpose of these storage schemes is to enable the storage of the tree without the use of links or pointers in the tree structure. To ensure proper operation, the storage scheme needs to be such that after the removal of the links, the nodes are arranged sequentially in the memory in such a manner that the nodes that can be used to refine the context always follow the parent node in storage order.

The nodes of the tree are stored branch by branch in the described manner. A single internal node I from the decision tree contains data elements of the following information:
- attribute value, such as letter
- one bit to distinguish between internal node I/leaf L
- attribute type $a_i$
- phoneme $p_i$ that corresponds to the specific context A single leaf L node contains data elements of the following information:
- attribute value, such as letter
- one bit to distinguish between internal node I/leaf L
- phoneme $p_i$ that corresponds to the specific context one bit to indicate whether this is the last leaf of the parent node With the proposed approach, the memory requirements of the decision tree models can be minimized. For the later purposes the data element of the decision tree is defined to be attribute type, attribute value or phoneme.

3. Methods for Representing the Data Elements in the Decision Tree

This part of the invention describes three methods for representing the data elements of the decision tree in order to achieve the minimum memory requirements. The methods proposed are a fixed bit allocation, the variable bit allocation for the decision tree data elements, and the Huffman coding of the decision tree data elements.

Fixed Bit Allocation for the Decision Tree Data Elements

The size of the decision tree is the sum of the sizes of all internal nodes and leaves. In the following the size of internal nodes and leaves are analyzed. The numbers presented here are for English language.

a) The number of attribute values:
There are twenty-six letters, less than sixty-four phonemes and less than sixteen phoneme classes. The maximum value among these is sixty-four, therefore six bits are assigned for the attribute values b) The number of attribute types:
For the context length of four there are four letters on the left and right side of the current letter, four phonemes on the left and four phoneme classes on the left side of the current letter. This makes sixteen in total and therefore four bits are assigned for the attribute types.

c) The number of the phonemes:
For English language the number is between thirty-two and sixty-four, so six bits are assigned for the phonemes.

d) Flag to denote internal nodes/leaves needs only one bit.

e) Flag to denote the end of leaves for given internal node needs only one bit.

The bit allocation presented above is called fixed bit allocation, since the number of bits is predefined and fixed.

The sizes for the internal node and the leave can be determined as follows:

For the internal node, the size is a sum of items a), b), c) and d):

Internal_node_size=6+4+6+1=17 bits

For the leave, the size is a sum of items a), b), d) and e):

Leave_size=6+6+1+1=14 bits

Variable Bit Allocation for the Decision Tree Data Elements

In the decision tree based text-to-phoneme mapping, each tree corresponds to one letter. In the part 1 of the invention, the clipping method is proposed. For a given letter, only the corresponding phonemes listed in the table 2 are allowed in the aligned dictionary. Therefore for each tree, the number of phonemes is limited by Table 2. For example, letter "a" has 7 possible phonemes wherein 3 bits are needed to assign for phonemes rather than 6 bits for all phonemes as described above (c). This is because only 7 phonemes are used for letter "a", all others are clipped out during alignment. Now the number of bits is reduced by 3 for both internal node and leaves. Of course, the number of bits assigned for phonemes will be different for different leaves.

In the clipping method, each letter l can only map to letter-dependent phoneme set.

l p, where p∈{$p_1, p_2, \ldots, p_n$}.

The phoneme can be coded based on the letter-dependent phoneme set, rather than the whole language-dependent phoneme set. This method is called variable bit allocation, since the number of bits assigned for the phonemes can vary from letter to letter and tree to tree. For example, with the methods of the fixed bit allocation "a" is mapped to the whole set (40 phonemes), when with the method of the variable bit allocation letter "a" can map to the letter-dependent phoneme set (8 phonemes in English). This way it needs [log 2(40)]=6 bits with the fixed bit allocation, and [log 2(8)]=3 bits with the variable bit allocation.

It is possible to use letter dependent bit allocation also for other data elements such as attribute types and attribute values. In order to do that, for a given letter, the set of all possible attribute types and attribute values need to be found. Once these sets are known, the number of bits required for the attribute types and attribute values can be computed.

In order to use the variable bit allocation for the decision tree data elements, the sets of the allowed phonemes, attribute types and attribute values are found for each letter. Once the sets are known, they are stored in tables. If the size of the table for data element is n, the number of bits required to store the data element with the variable bit allocation is [log 2(n)] bits. The table needs to be stored in memory which introduces an overhead. Therefore variable bit allocation is used only if the saving due to the variable bit allocation (Saved_var_bits) is greater than the overhead of storing the table (Overhead_var_bits).

The number of the saved bits is computed in the following way:

Saved_var_bits=(Num_bits_fixed−Num_bits_variable) Count_occurrence

Num_bits_fixed corresponds to the number of bits assigned for the data element with the fixed bit allocation. Num_bits_variable corresponds to the number of bits assigned for the data element with the variable bit allocation. Count_occurrence is the total number of time the data element occurs in the decision tree.

The overhead of storing table for the data element is computed in the following way:

Overhead_var_bits=(Size_table+1)Bits_in_byte

The Size_table corresponds to the number of elements in the table and Bits_in_byte is eight.

The comparison between Saved_var_bits and Overhead_var_bits is checked for each data element (attribute type, attribute value and phoneme) and if the Saved_var_bits is greates than the Overhead_var_bits, the variable bit allocation is used:

if Saved_var_bits>Overhead_var_bits

Huffman Coding of the Decision Tree Data Elements

To assign a binary code for the decision tree data elements the Huffman code can be used. The usage of the Huffman code can save memory if the distribution of the decision tree data element has a large variation. The basic idea in Huffman coding is to assign short codewords to data elements with high probabilities and long codewords to data elements with low probabilities. Huffman codes are optimal and lossless. The code is a variable length code, where the number of bits for coding the data element is given by length of the codeword corresponding to a particular data element. The Huffman code has to be derived for each of the decision tree variables individually.

Table 3 below shows an example of the Huffman coding for the phonemes of letter "a" tree for English. Compression rate for phonemes is 1.2554. "FLC" in the table stands for Fixed Length Code.

TABLE 3

Coding of phonemes for US-English letter "a" in the decision tree

| | Phonemes | | | | | | | |
|---|---|---|---|---|---|---|---|---|
| | A: | ä | aI | E | eI | I | V | — |
| Probability | 0.2238 | 0.277 | 0.0019 | 0.0250 | 0.1211 | 0.0075 | 0.2650 | 0.0780 |
| FLC | 000 | 001 | 010 | 011 | 100 | 101 | 110 | 111 |
| Huffman code | 10 | 01 | 110000 | 11001 | 111 | 110001 | 00 | 1101 |

In order to use Huffman coding for the decision tree data elements, the Huffman code words, the number of bits for each code word and the corresponding alphabet need to be stored in memory which introduces overhead. The decision of whether to use Huffman coding or not is done individually for each data element. For a given data element, Huffman coding can be used only if the saving due to Huffman coding (Saved_huff_bits) is greater than the overhead (Overhead_huff_bits).

The number of saved bits due to Huffman coding can be computed from:

Saved_huff_bits=$_i$(Num_bits_fixed−Num_bits_CW$_i$) Count_CW$_i$

The Num_bits_fixed is the number of bits assigned for the data element with the fixed bit allocation. The Num_bits_CW$_i$ corresponds to the number of bits assigned for the ith code word occurs in the Huffman encoded tree.

The overhead of storing the Huffman code can be computed from:

Overhead_huff_bits=(3 Num_huff_CW+1) Bits_per_byte

The Num_huff_CW is the number of Huffman code words for the data element, and Bits_per_byte is eight. It has been assumed that the Huffman code words, the variables indicating the number of bits in the Huffman code words, and the members of the alphabet are stored in single byte variables.

Comparison between the Saved_huff_bits and the Overhead_huff_bits is checked for each data element (attribute type, attribute value and phoneme) and Huffman coding is applied for the data element if the determined condition is met as if Saved_huff_bits>Overhead_huff_bits.

Minimization of the Memory Required to Store the Decision Tree Data Elements

The basic structure of storing the tree is fixed as explained in the beginning of the part 2, but the data elements in the tree can be represented in various ways. The bit assignment can be fixed, or it can be variable, or Huffman coding can be used. The decision between these coding methods is made for each data element (attribute type, attribute value and phoneme) in a decision tree. Since there is a decision tree based text-to-phoneme model for each letter, the selection is repeated for each letter.

In an alternative embodiment, the decision to use either fixed-length coding or Huffman coding is supplemented with the possibility to use so-called truncated Huffman coding. In this coding method, certain values of the data elements that have very low probability are grouped together and a common Huffman prefix code is assigned to the group. The actual value of the data element from the group of values is then coded with a fixed-length code. For example, a group of 8 very improbable values could be coded with a Huffman code of, say, 7 bits, followed by a fixed length code of 3 bits.

For the given data element in the given tree, the selection of whether to use fixed bit assignment, variable bit assignment or Huffman coding is done so that the memory requirements for the low memory decision tree model are minimized. Therefore, the decision is based on the following logic:

a) Initialization: It is assumed that fixed bit assignment is used for the data element;
b) If Saved_var_bits>Overhead_var_bits the variable bit assignment for the data element is used;
c) If the saving due to Huffman coding is greater than the saving due to the variable bit assignment and greater than the overhead introduced by the Huffman code, the Huffman coding for the data element is used:

Saved_huff_bits - Overhead_huff_bits >Saved_var_bits − Overhead_var_bits
AND
Saved_huff_bits > Overhead_huff_bits The invention utilizes this minimization approach to automatically determine the minimum bit allocation for each decision tree data element in all decision trees.

EXPERIMENT

The invention has been experimented by training decision trees on the pronunciations of the US Census name list that are extracted from CMU (Carnegie Mellon University) dictionary. The total number of pronunciations is 40,529. The baseline implementation uses original alignment with fixed bit allocation of the decision tree data elements. As shown in Table 4 below, the decision tree model size is significantly reduced (36%) and text-to-phoneme performance has no degradation in terms of phoneme accuracy and string rate. It verifies the usefulness of the invention.

TABLE 4

The decision tree comparison between prior art and inventive approaches.

| Methods | Memory (kB) | Phoneme accuracy | String rate |
|---|---|---|---|
| Prior art | 132.5 | 99.27% | 97.12% |
| Invention | 84.9 | 99.27% | 97.17% |

Different innovative techniques have been introduced in the invention: The clipping method in the alignment, decision tree structure, fixed bit allocation for decision tree data elements, variable bit allocation for decision tree data elements and Huffman coded bit for decision tree data elements. It will be evident to those of skill in the art that all techniques can be utilized individually or combined in different manners so that the description of the invention should not be considered as a limitation of the invention.

Figure 7:
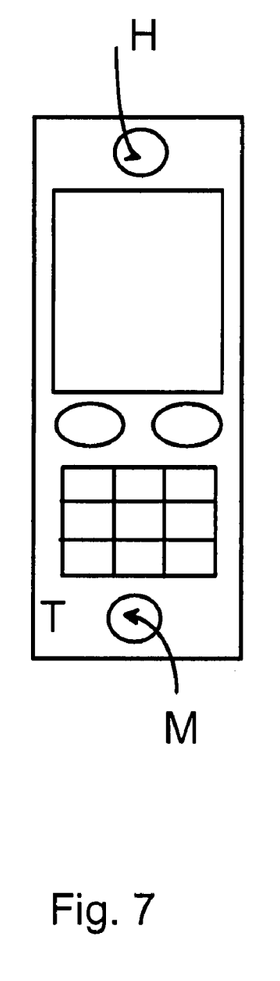
FIG. 7 shows very principled example of the device using the method according to the invention.

The text-to-phoneme system can be implemented as a part of the speech recognition system in an electronic device, for example as a digital signal processing unit. The electronic device can comprise other functions, such as for example means for telecommunication as in cellular phone T (FIG. 7). The device preferable comprises a speaker H, a microphone M. The text-to-phoneme system is also possible to implement within a concurrent device used with the electronic device. Considering the cellular phone as the electronic device, the concurrent device can be e.g. headset or video goggles.

The text-to-phoneme-system can additionally be used in ubiquitous environment, wherein the system can be implemented in various rooms of a house, in various domestic appliances (e.g. video, washing machine), in furniture or in wearable accessories (e.g. clothes).

The embodiments described above should not be interpreted as limitations of the invention but they can vary in the scope of the inventive features presented in the following claims.

The invention claimed is:

1. A method comprising:
   creating a decision tree for pronunciation modelling application for efficient representation in an electronic memory of an electronic device, said decision tree comprising a parent node and at least one leaf node, said creating the decision tree further including
   arranging said nodes in the decision tree such that said nodes comprise at least one datum that has been coded according to a coding method that provides minimum bits for said datum, said at least one datum corresponding to a phoneme in a specific context, the specific context being defined by at least one data of a parent node also corresponding to a phoneme,
   mapping the nodes of said decision tree sequentially to an array in such a manner that nodes follow the parent node in storage order without a link from their parent node, and
   mapping the array to a memory structure stored in a computer readable medium to be used for text-to-phoneme translation.

2. The method of claim 1, wherein the nodes of a decision tree are stored by one of the following schemes: a depth-first scheme, a breadth-first scheme or a composite of said schemes.

3. The method of claim 1 wherein before storing the decision tree is trained with an aligned set of data elements, said elements being initialized with a penalty depending on the validity of said element, wherein the penalty is further re-initialized, depending on the known characteristics of said element, by adding a constraint for an invalid element.

4. The method of claim 1 wherein the method is for a text-to-phoneme mapping, wherein data of said nodes comprise also elements such as letters, wherein the decision tree is created for one letter and the nodes comprise the phonemes of said letter.

5. The method of claim 1, wherein the datum of the node is stored in one of the following format; with fixed bits, with variable bits or with Huffman codes.

6. The method of claim 3, wherein the method is for a text-to-phoneme mapping, wherein data of said nodes comprise also elements such as letters, wherein the decision tree is created for one letter and the nodes comprise the phonemes of said letter.

7. The method of claim 4, wherein the nodes further comprise information about the context of said letter, such as surrounding letters.

8. The method of claim 4, wherein the validity of the phoneme is checked whether it is one of the allowed phonemes, wherein said penalty is initialized with zero; or whether it is not allowed phoneme, wherein said penalty is initialized with a large positive value.

9. The method of claim 5, wherein the elements are presented is variable bit format if a saving due to the variable bit format is greater than a overhead of storing a table comprised by the elements; or elements are Huffman coded if a saving due to Huffman coding is greater than a saving due to the variable bit format and greater than the overhead introduced by the Huffman code.

10. The method of claim 5, wherein the storing format is selected substantially to every element individually.

11. The method of claim 8, wherein the validity of the phoneme is further checked whether it is linguistically allowed, wherein the penalty is re-initialized with zero; or whether the phoneme is not a linguistically allowed phoneme, wherein the penalty is re-initialized with a large positive value.

12. The method of claim 9, wherein the saving due to the variable bit format is determined by multiplying a sum of the number of bits assigned to the element with the fixed bit format and the number of bits assigned to the element with the variable bit format with a total number of times the element occurs in the decision tree.

13. The method of claim 9, wherein the saving due to the Huffman coding is calculated by multiplying a sum of the number of bits assigned to the element with the fixed bit format and the number of bits assigned for a codeword with the number of times the codeword occurs in the Huffman encoded tree.

14. The method of claim 9, wherein the storing format is determined by multiplying a sum of the number of bits assigned to the element with the fixed bit format and the number of bits assigned to the element with the variable bit format with a total number of times the element occurs in the decision tree.

15. The method of claim 11, wherein the at least one datum of the node is stored in one of the following format; with fixed bits, with variable bits or with Huffman codes.

16. The method of claim 12, wherein the storing format is determined by multiplying a sum of the number of bits assigned to the element with the fixed bit format and the number of bits assigned to the element with the variable bit format with a total number of times the element occurs in the decision tree.

17. The method of claim 13, wherein the storing format is determined by multiplying a sum of the number of bits assigned to the element with the fixed bit format and the number of bits assigned to the element with the variable bit format with a total number of times the element occurs in the decision tree.

18. A system for managing a treelike data structure, which system comprises
   a decision tree creator, which comprises executable code embedded in a computer readable storage medium, for creating a decision tree for a pronunciation modelling application for efficient representation in an electronic memory of an electronic device, said decision tree comprising a parent node and at least one leaf node,
   wherein the decision tree creator is adapted to arrange said nodes in the decision tree such that said nodes comprise at least one datum that has been coded according to a coding method that provides minimum bits for said datum, said at least one datum corresponding to a phoneme in a specific context, the specific context being defined by at least one datum of a parent node also corresponding to a phoneme, the decision tree creator is adapted to map the nodes of said decision tree sequentially to an array in such a manner, that nodes follow the parent node in storage order without a link from their parent node, and the decision tree creator is adapted to map the array to a memory structure stored in said electronic memory to be used for text-to-phoneme translation.

19. The system of claim 18, wherein the storage order is one of the following schemes: a depth-first scheme, a breadth-first scheme or a composite of said schemes.

20. The system of claim 18 wherein the system is configured to train the decision tree with an aligned set of data elements, to initialize one or more of said elements with a penalty depending on validity of an element, and re-initializing the penalty further depending on known characteristics of said element by adding a constraint for an invalid element.

21. The system of claim 18, wherein the system applies a text-to-phoneme mapping, wherein data of said nodes comprise also elements such as letters, wherein the decision tree corresponds one letter and said nodes comprises the phonemes of said letter.

22. The system of claim 18, wherein the data of the nodes is represented in one of the following ways: variable or fixed or Huffman coded binary digits.

23. The system of claim 20, wherein the system applies a text-to-phoneme mapping, wherein data of said nodes comprise elements such as letters and phonemes, wherein the decision tree corresponds one letter and said nodes comprises the phonemes of said letter.

24. The system of claim 21, wherein the nodes further comprise information about the context of said letter, such as surrounding letters.

25. The system of claim 21, wherein the system is adapted to check the validity of the phoneme whether it is one of the allowed phonemes, wherein the system is adapted to initialize said penalty with zero; or if the phoneme is not an allowed phoneme, the system is adapted to initialize said penalty with a large positive value.

26. The system of claim 21, wherein the system is further adapted to check the validity of the phoneme whether it is linguistically allowed, wherein the system is adapted to initialize said penalty with zero; or if the phoneme is not a linguistically allowed phoneme, the system is adapted to initialize said penalty with a large positive value.

27. The system of claim 22, wherein the system is adapted to check which of said formats produces greater saving than the other by comparing said formats together, wherein the system is adapted to use that binary format that produces said greater saving.

28. The system of claim 26, wherein the data of the nodes is represented in one of the following ways: variable or fixed or Huffman coded binary digits.

29. An electronic device comprising:

a storage medium for storing a decision tree creator program;

a processor for executing said decision tree creator program for creating a decision tree for a pronunciation modelling application for efficient representation in a memory of the electronic device, said decision tree comprising a parent node and at least one leaf node, wherein the decision tree creator is adapted to arrange said nodes in the decision tree such that said nodes comprise at least one datum that has been coded according to a coding method that provides minimum bits for said datum, said at least one datum corresponding to a phoneme in a specific context, the specific context being defined by at least one datum of a parent node also corresponding to a phoneme, the decision tree creator is adapted to map the nodes of said decision tree sequentially to an array in such a manner, that nodes follow the parent node in storage order without a link from their parent node, and the decision tree creator is adapted to map the array to a memory structure in said memory electronic device to be used for text-to-phoneme translation.

30. The device of claim 29, wherein the storage order is one of the following schemes: a depth-first scheme, a breadth-first scheme or a composite of said schemes.

31. The device of claim 29, wherein the device applies a text-to-phoneme mapping, wherein data of said nodes comprise elements, such as letters and phonemes, wherein the decision tree is for one letter and the nodes comprise the phonemes of said letter.

32. The device of claim 29 further comprising a speech recognition system.

33. The device of claim 29 further configured for telecommunication.

34. A computer program product, stored on a computer readable storage medium comprising a computer readable code executable by a processor in an electronic device, wherein said computer program product comprises computer readable code instructions for creating a decision tree for a pronunciation modeling application, said tree-like data structure comprising a parent node and at least one leaf node, computer readable code instructions for arranging said nodes in the decision tree such that said nodes comprise at least one data that has been coded according to a coding method that provides minimum bits for said data, said at least one data corresponding to a phoneme in a specific context, the specific context being defined by at least one data of a parent or a grandparent node also corresponding to a phoneme, computer readable code instructions for mapping the nodes of said decision tree sequentially to an array in such a manner, that the nodes follow the parent node in storage order without a link their parent node, and computer readable code instructions for mapping the array to a memory structure in said memory of said electronic device to be used for text-to-phoneme translation.

* * * * *